F. W. DILL.
CORN HARVESTER.
APPLICATION FILED FEB. 16, 1909.
946,936.
Patented Jan. 18, 1910.
2 SHEETS—SHEET 1.
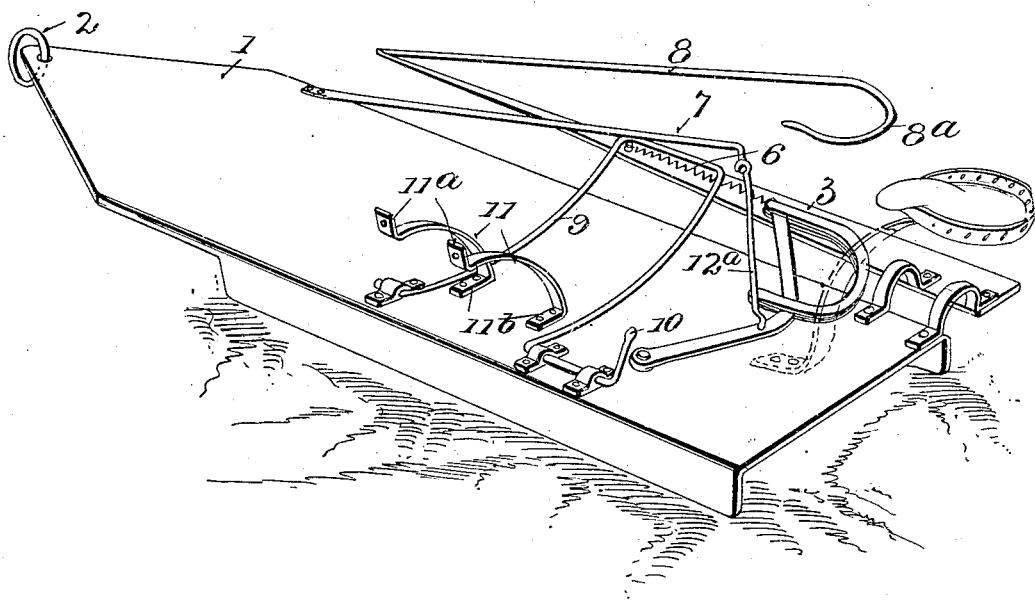
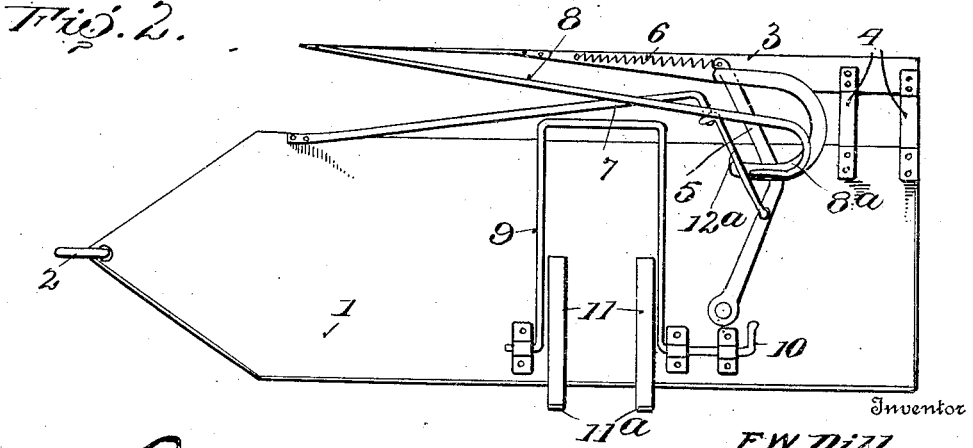
Inventor
F. W. Dill

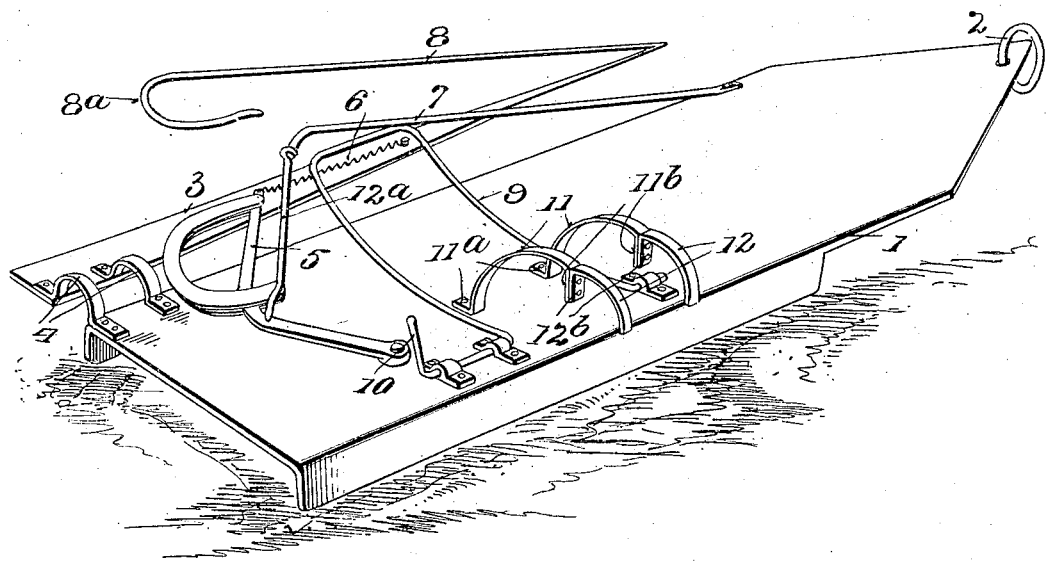
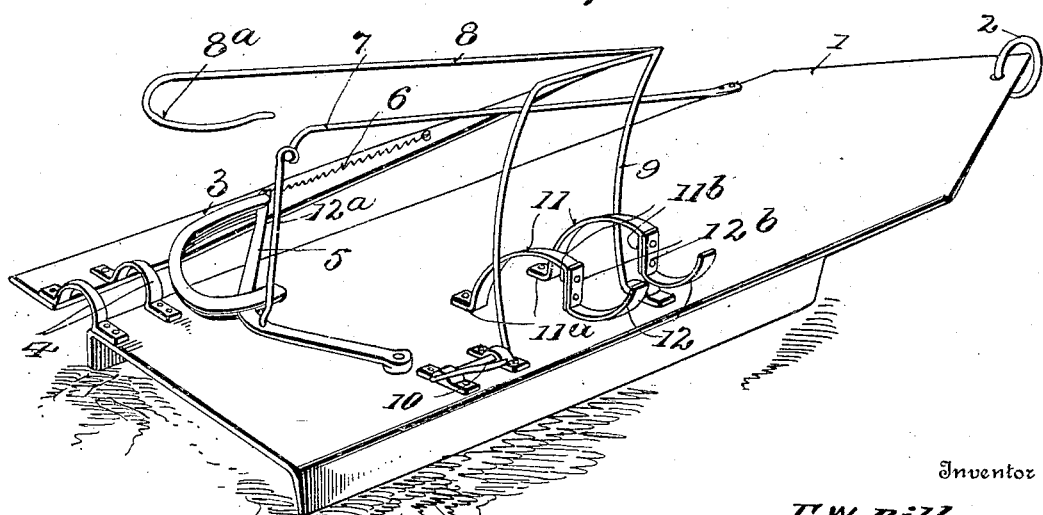

UNITED STATES PATENT OFFICE.

FREDERICK W. DILL, OF LINCOLN, KANSAS, ASSIGNOR TO A. W. ELGIN, TRUSTEE, OF LINCOLN, KANSAS.

CORN-HARVESTER.

946,936. Specification of Letters Patent. Patented Jan. 18, 1910.

Application filed February 16, 1909. Serial No. 478,162.

*To all whom it may concern:*

Be it known that I, FREDERICK W. DILL, citizen of the United States, residing at Lincoln, in the county of Lincoln and State of Kansas, have invented certain new and useful Improvements in Corn-Harvesters, of which the following is a specification.

The present invention relates in general to agricultural implements and more particularly to an improved form of harvester embodying a novel construction for acting upon the corn as it stands in rows to cut the same and collect it after the cutting.

The object of the invention is the provision of a corn harvester which is simple in its construction and operation, which can be readily drawn across a field, and which operates in a reliable and effective manner to accomplish the desired result.

For a full understanding of the invention and the merits thereof and also to acquire a knowledge of the details of construction and the means for effecting the result, reference is to be had to the following description and accompanying drawings, in which:

Figure 1 is a perspective view of a corn harvester embodying the invention; Fig. 2 is a top plan view of the same; Fig. 3 is a perspective view of the harvester showing the extensions applied to the curved guide members which coöperate with the swinging frame to elevate the corn after it has been cut, the said extensions being arranged to discharge the corn upon the ground on one side of the harvester; Fig. 4 is a similar view with the extensions arranged in an inverted position so as to collect the corn instead of dropping it upon one side of the harvester, the swinging frame being shown in an elevated position.

Corresponding and like parts are referred to in the following description and indicated in all the views of the drawings by the same reference characters.

The harvester mechanism is designed to be mounted upon a portable base which in the present instance is in the form of a sled 1, a clevis 2 of the conventional construction being provided at the forward end of the sled for the attachment of the draft animals. Extending along one side of the sled and spaced therefrom is a longitudinal guide member 3 the rear end of which is secured to the sled by means of the arch shaped spring members 4. This longitudinal guide member 3 is tapered toward the forward end thereof and the space between the guide member and the sled is flared toward the forward end of the sled so as to readily receive the stalks of corn as the harvester is drawn across the field. The corn which is received within this space between the guide member and the sled is directed against a knife blade 5 which extends across the space at the rear end of the sled and is arranged so as to have a draw cut. In the present instance this knife has an elbow formation and comprises two arms arranged at an angle to each other, one of the arms of the blade being pivoted to the sled 1 while the opposite arm is connected to a spring 6 which extends forwardly along the longitudinal guide member 3 and is secured thereto. It will thus be obvious that both the knife and the guide member are yieldingly mounted so as to have a limited amount of movement, and such a construction has the advantage of enabling the guide member to readily accommodate itself to the corn, and of causing the knife to act in an effective manner upon the corn.

A lower guide rail 7 is mounted upon the sled 1 and projects partially into the space between the sled and the longitudinal guide member 3, while an upper guide rail 8 is carried by the longitudinal guide member 3 and terminates in a hook $8^a$ which is arranged over the knife the guide rail 8 being partially overlapped above the rail 7. While the corn is being cut by the knife blade 5, it is engaged by the hooked end $8^a$ of the guide rail 8 and retained therein until the stalks are cut when the stalks are caused to fall forwardly and to strike the agitator $12^a$ which guides the stalks upon a transversely disposed swinging frame 9 mounted upon the sled. This swinging frame 9 is controlled by a hand lever 10 applied to the pivot end thereof and may be either swung upwardly so as to elevate the corn thereon, or permitted to rest upon the sled so as to receive the stalks of corn deposited thereon by the guide rail 7 and hook $8^a$ of the guide rail 8. Curved guide members 11 are applied to the sled 1 so as to coöperate with the swinging frame 9 to elevate the stalks of corn thereon when the swinging frame is swung upwardly. These curved guide members 11 preferably have the shape of quadrants and are each provided at one end with an outwardly extending radial arm 11ª and at the opposite end with an inwardly extending radial arm 11ᵇ. When the outwardly extending arms 11ª are secured to the sled, as indicated in Fig. 3, the inwardly extending arm 11ᵇ at the opposite ends of the guide members extend downwardly and are designed to have the arms 12ᵇ of extensions 12 secured thereto. These extensions 12 also have substantially the shape of quadrants and when arranged in one position curve downwardly so as to form continuations of the guide members 11. The corn stalks which are elevated when the swinging frame 9 is moved upwardly are then carried over the side of the sled and deposited upon the ground. However, when the extensions 12 are arranged in an inverted position so as to be curved reversely with respect to the curved guide members 11, they serve to collect the corn so that it is carried along with the sled. When the extensions 12 are not employed, the curved guide members 11 may be reversed as shown in Fig. 1, the inwardly extending radial arms 11ᵇ being secured to the sled while the outwardly extending radial arms 11ª project upwardly from the extremities of the curved guide members. These outwardly extending radial arms 11ª then serve to engage the corn when the swinging frame is moved upwardly, thereby enabling the operator to gather the corn without the necessity of stooping.

12ª designates an agitator that is designed to throw the butts away from the knife. This agitator is slidingly engaged with the rail 7, and moves with the knife, as clearly illustrated in the drawings.

The operation of the device is as follows: As the sled is moved over the ground the corn stalks are engaged between the side of the same and the guide 3 and as the rail 7 is inclined outwardly from the sled 1, the corn stalks are bent outwardly against the guide rail 8 and causes the separation of the rails. When the stalks are carried backwardly of the rail 7 they are engaged against the blade 5 which yieldingly strikes against the same and causes a sliding movement of the knife 5, owing to its diagonal position upon the sled 1, and thereby causes a severing of the stalks. As the stalks are pressed against the guide 3 the upper rail 8 is swung outwardly and the lower rail 7 is swung inwardly to allow the stalks to pass between the sled and guide 3 to engage against the blade of the knife 5. When the stalks reach the rear end of the sled 1, the hooked end 8ª of the rail 8 directs the stalks slightly inwardly over the sled 1 and after the stalks are cut they are caused to fall inwardly and forwardly over the frame 9 and to slide centrally of the same. The frame 9 is now raised through the medium of the handle 10 to impinge the stalks carried upon the frame 9 against the members 11 and to thereby raise the stalks over the members 11 until they are brought into engagement with angle portion 11ª where they may be readily picked up by the hand or the like and thrown into a cart or other receptacle. When the members 11 are reversed in position upon the sled 1 the extensions 12 are secured thereto at the down-turned portions 11ᵇ, the extensions 12 carrying the stalks on the outer side of the sled 1 and depositing the same upon the ground. By reason of the diagonal positioning of the agitator 12ª and the loose connection of the same with the rail 7 the butts are thrown backwardly at their lower ends to insure the falling of the same upon the frame 9 as the agitator is actuated by the movement of the rail 7. The operator may, if he desires, allow a quantity of stalks to accumulate upon the frame 9 before raising the same to discharge them from the apparatus.

Having thus described the invention, what is claimed as new is:

1. In a corn harvester, the combination of a portable base, a guide member extending along one side of the base and spaced therefrom, springs connecting the guide member to the base so that the guide member is yieldably mounted, a knife blade extending across the space between the base and the guide member, a guide rail carried by the base, and a second guide rail carried by the before mentioned guide member said guide rails adapted to direct the stalks to said knife blade.

2. In a corn harvester, the combination of a portable base, a guide member extending along one side of the base and spaced therefrom, an elbow shaped blade extending across the space between the base and the guide member, one end of the blade being pivoted upon the base, a spring connecting the opposite end of the blade to the guide member, a guide rail carried by the base, and a second guide rail carried by the guide member.

3. In a corn harvester, the combination of a portable base, cutting means upon the base, a swinging frame upon the base, means for receiving the corn from the cutting means and depositing it upon the swinging frame, and curved guides coöperating with the swinging frame to elevate the corn.

4. In a corn harvester, the combination of a portable base, a cutting mechanism upon the base, a swinging frame upon the base, means for delivering the corn from the cutting mechanism to the swinging frame, curved guides coöperating with the swinging frame to elevate the corn, and extensions upon the curved guides for collecting the corn elevated by the swinging frame.

5. In a corn harvester, the combination of a portable base, cutting means upon the base, a swinging frame upon the base, means for delivering the corn from the cutting means to the swinging frame, curved guides upon the base for coöperation with the swinging frame to elevate the corn, and curved extensions constructed to be applied to the curved guides either so as to form extensions thereof and cause the corn to be discharged upon one side of the base, or in an inverted position so as to collect the corn.

In testimony whereof I affix my signature in presence of two witnesses.

FREDERICK W. DILL. [L. S.]

Witnesses:
ARCHIE HAZEN,
OSCAR PETERSON.